(12) United States Patent
Gao et al.

(10) Patent No.: US 11,982,731 B2
(45) Date of Patent: May 14, 2024

(54) RADAR SIGNAL PROCESSING METHOD AND APPARATUS

(71) Applicant: HUAWEI TECHNOLOGIES CO., LTD., Guangdong (CN)

(72) Inventors: Lutao Gao, Beijing (CN); Lei Wan, Beijing (CN); Sha Ma, Beijing (CN); Sida Song, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 475 days.

(21) Appl. No.: 17/238,276

(22) Filed: Apr. 23, 2021

(65) Prior Publication Data
US 2021/0239824 A1  Aug. 5, 2021

Related U.S. Application Data

(63) Continuation of application No. PCT/CN2019/113249, filed on Oct. 25, 2019.

(30) Foreign Application Priority Data

Oct. 26, 2018 (CN) .......................... 201811256435.7

(51) Int. Cl.
*G01S 13/58* (2006.01)
*G01S 7/35* (2006.01)
*G01S 13/536* (2006.01)

(52) U.S. Cl.
CPC ............ *G01S 13/584* (2013.01); *G01S 7/352* (2013.01); *G01S 13/536* (2013.01)

(58) Field of Classification Search
None
See application file for complete search history.

(56) References Cited

U.S. PATENT DOCUMENTS

| 2011/0205523 A1* | 8/2011 | Rezk ................. G01B 9/02004 356/5.09 |
| 2015/0355321 A1* | 12/2015 | Yukumatsu ........... G01S 13/345 342/27 |

(Continued)

FOREIGN PATENT DOCUMENTS

| CN | 102150007 A | 8/2011 |
| CN | 102169180 A | 8/2011 |

(Continued)

OTHER PUBLICATIONS

Extended European Search Report issued in EP 19876754.3, dated Sep. 20, 2021, 7 pages.

(Continued)

*Primary Examiner* — Whitney Moore

(57) ABSTRACT

This application provides a radar signal processing method and apparatus, which are applicable to the waveform design of a millimeter-wave radar. The radar signal processing method is applicable to an apparatus, for example, a millimeter-wave radar or a chip system inside the millimeter-wave radar, and the method includes: transmitting a first radar signal on a first frequency band; transmitting a second radar signal on a second frequency band; receiving a first reflected signal and a second reflected signal, where the first reflected signal is an electromagnetic wave reflected by a target object in response to the first radar signal, and the second reflected signal is an electromagnetic wave reflected by the target object in response to the second radar signal; and obtaining at least one of range information, velocity information, and angle information of the target object.

18 Claims, 16 Drawing Sheets

(56) References Cited

U.S. PATENT DOCUMENTS

| | | | |
|---|---|---|---|
| 2016/0097853 A1* | 4/2016 | Kamo | H01Q 1/32 |
| | | | 342/70 |
| 2017/0285159 A1 | 10/2017 | Kuo et al. | |
| 2018/0172816 A1 | 6/2018 | Chiu et al. | |
| 2019/0265353 A1* | 8/2019 | Jones | G01S 15/8915 |
| 2019/0324133 A1* | 10/2019 | Hong | G01S 7/42 |

FOREIGN PATENT DOCUMENTS

| | | |
|---|---|---|
| CN | 103630888 A | 3/2014 |
| CN | 103728593 A | 4/2014 |
| CN | 104345308 A | 2/2015 |
| CN | 104459683 A | 3/2015 |
| CN | 107688178 A | 2/2018 |
| CN | 108027272 A | 5/2018 |
| EP | 2329218 B1 | 10/2018 |
| JP | 2001083238 A | 3/2001 |
| WO | 2012038662 A1 | 3/2012 |

OTHER PUBLICATIONS

Office Action issued in CN201811256435.7, dated Jul. 2, 2021, 12 pages.
International Search Report and Written Opinion issued in PCT/CN2019/113249, dated Feb. 6, 2020, 11 pages.

\* cited by examiner

RADAR SIGNAL PROCESSING METHOD AND APPARATUS

CROSS-REFERENCE TO RELATED APPLICATIONS

This application is a continuation of International Application No. PCT/CN2019/113249, filed on Oct. 25, 2019, which claims priority to Chinese Patent Application No. 201811256435.7, filed on Oct. 26, 2018. The disclosures of the aforementioned applications are hereby incorporated by reference in their entireties.

TECHNICAL FIELD

This application relates to the field of microwave radar, and in particular, to a millimeter-wave radar signal processing method and apparatus.

BACKGROUND

With the development of society, ever-increasing machines in modern life develop towards automation and intelligence. Mobile traveling vehicles are no exception. Intelligent vehicles are gradually entering people's daily life. In recent years, advanced driving assistant systems (ADAS) play an important role in intelligent vehicles. In an advanced driving assistant system, in a traveling process of the vehicle, various sensors installed on the vehicle are used to sense a surrounding environment at any time, collect data, identify, detect, and track static and moving objects, and perform systematic calculation and analysis with reference to navigation map data, so that a driver can be aware of a possible danger in advance, thereby effectively improving comfort and safety of driving.

In the prior art, limited bandwidth can be used for radar such as millimeter-wave radar due to limitations imposed by laws and regulations. Therefore, how to effectively use limited bandwidth resources to design a waveform to implement efficient work of the radar is a technical problem that needs to be urgently resolved.

SUMMARY

Embodiments of this application provide a radar signal processing method and apparatus, to increase frequency sweep bandwidth of radar.

To achieve the foregoing objective, the following technical solutions are used in the embodiments of this application:

According to a non-limiting first aspect of an example embodiment, a radar signal processing method is provided, and is applied to a first apparatus, and the method includes: transmitting a first radar signal on a first frequency band; transmitting a second radar signal on a second frequency band; receiving a first reflected signal and a second reflected signal, where the first reflected signal is an electromagnetic wave obtained after the first radar signal is reflected by a target object, and the second reflected signal is an electromagnetic wave obtained after the second radar signal is reflected by the target object; and obtaining at least one of range information, velocity information, and angle information of the target object. According to the radar signal processing method provided in this embodiment, two radar signals are transmitted on different frequency bands, and reflected signals of the two radar signals are correspondingly received, to obtain the at least one of the range information, the velocity information, and the angle information of the target object. Radar signals can be transmitted by using inconsecutive frequency domain resources, and therefore frequency sweep bandwidth of radar is expanded. In this way, range resolution of the radar is improved.

In an example embodiment, the obtaining at least one of range information, velocity information, and angle information of the target object includes: obtaining the at least one of the range information, the velocity information, and the angle information based on the first radar signal and the first reflected signal; or obtaining the at least one of the range information, the velocity information, and the angle information based on the second radar signal and the second reflected signal; or obtaining the at least one of the range information, the velocity information, and the angle information based on the first radar signal, the first reflected signal, the second radar signal, and the second reflected signal. In this implementation, the at least one of the range information, the velocity information, and the angle information of the target object may be obtained based on the radar signal and the corresponding reflected signal.

In an example embodiment, the first radar signal and the second radar signal are transmitted in a first time unit, a duration of the first radar signal is the same as duration of the second radar signal, and a length of the first time unit is equal to the duration. In other words, the duration of the first radar signal may be the same as the duration of the second radar signal. The duration may also be referred to as a frequency sweep time period. The duration or the frequency sweep time period is a duration in which a frequency of a radar signal linearly increases from an initial frequency to a maximum frequency. For example, for a sawtooth wave, the duration may be a duration of one transmission period, and for a triangular wave, the duration may be understood as a duration of half a transmission period.

In an example embodiment, the first frequency band and the second frequency band do not completely overlap in frequency domain. In other words, the first frequency band and the second frequency band may partially overlap in frequency domain.

In an example embodiment, at least one of the first radar signal and the second radar signal is a linear frequency modulated continuous wave, and the linear frequency modulated continuous wave is an electromagnetic wave whose frequency linearly increases or decreases with time. The first radar signal or the second radar signal may be a sawtooth wave, or the first radar signal or the second radar signal is half a triangular wave.

In an example embodiment, frequency variations of the first radar signal and the second radar signal in a unit of time are opposites. Alternatively, expression may be as follows: A slope of a frequency of the first radar signal and a slope of a frequency of the second radar signal are opposites.

In an example embodiment, frequency variations of the first radar signal and the second radar signal in a unit of time are opposite in sign. Alternatively, expression may be as follows: A slope of a frequency of the first radar signal and a slope of a frequency of the second radar signal are opposite in sign. Alternatively, expression may be as follows: A frequency of the first radar signal linearly increases with time in a unit of time, and a frequency of the second radar signal linearly decreases with time in the unit of time; or a frequency of the first radar signal linearly decreases with time in a unit of time, and a frequency of the second radar signal linearly increases with time in the unit of time. In this case, time consumed for measuring the range information of the target object or the velocity information of the target object is reduced by half.

In an example embodiment, a frequency of the first radar signal and a frequency of the second radar signal increase with time in a unit of time; or a frequency of the first radar signal and a frequency of the second radar signal decrease with time in a unit of time. Alternatively, expression may be as follows: A sign of a slope of a frequency of the first radar signal is the same as a sign of a slope of a frequency of the second radar signal. That is, the frequency of the first radar signal and the frequency of the second radar signal may be increased or decreased at the same time.

In an example embodiment, frequency variations of the first radar signal and the second radar signal in the unit of time are the same. Alternatively, expression may be as follows: The slope of the frequency of the first radar signal is the same as the slope of the frequency of the second radar signal. Alternatively, expression may be as follows: In the unit of time, an absolute value of a variation by which the frequency of the first radar signal changes with time is the same as an absolute value of a variation by which the frequency of the second radar signal changes with time. In other words, the absolute value of the variation of the frequency of the first radar signal may be the same as the absolute value of the variation of the frequency of the second radar signal.

According to a non-limiting second aspect of an example embodiment, a radar signal processing apparatus is provided, and includes: a transmitting unit, configured to transmit a first radar signal on a first frequency band, where the transmitting unit is further configured to transmit a second radar signal on a second frequency band; a receiving unit, configured to receive a first reflected signal and a second reflected signal, where the first reflected signal is an electromagnetic wave obtained after the first radar signal is reflected by a target object, and the second reflected signal is an electromagnetic wave obtained after the second radar signal is reflected by the target object; and an obtaining unit, configured to obtain at least one of range information, velocity information, and angle information of the target object.

In an example embodiment, the obtaining unit is specifically configured to: obtain the at least one of the range information, the velocity information, and the angle information based on the first radar signal and the first reflected signal; or obtain the at least one of the range information, the velocity information, and the angle information based on the second radar signal and the second reflected signal; or obtain the at least one of the range information, the velocity information, and the angle information based on the first radar signal, the first reflected signal, the second radar signal, and the second reflected signal.

In an example embodiment, the first radar signal and the second radar signal are transmitted in a first time unit, a duration of the first radar signal is the same as a duration of the second radar signal, and a length of the first time unit is equal to the duration.

In an example embodiment, the first frequency band and the second frequency band do not completely overlap in frequency domain.

In an example embodiment, at least one of the first radar signal and the second radar signal is a linear frequency modulated continuous wave, and the linear frequency modulated continuous wave is an electromagnetic wave whose frequency linearly increases or decreases with time. The first radar signal or the second radar signal may be a sawtooth wave, or the first radar signal or the second radar signal is half a triangular wave.

In an example embodiment, frequency variations of the first radar signal and the second radar signal in a unit of time are opposites. Alternatively, expression may be as follows: A slope of a frequency of the first radar signal and a slope of a frequency of the second radar signal are opposites.

In an example embodiment, frequency variations of the first radar signal and the second radar signal in a unit of time are opposite in sign. Alternatively, expression may be as follows: A slope of a frequency of the first radar signal and a slope of a frequency of the second radar signal are opposite in sign. Alternatively, expression may be as follows: A frequency of the first radar signal linearly increases with time in a unit of time, and a frequency of the second radar signal linearly decreases with time in the unit of time; or a frequency of the first radar signal linearly decreases with time in a unit of time, and a frequency of the second radar signal linearly increases with time in the unit of time. In this case, time consumed for measuring the range information of the target object or the velocity information of the target object is reduced by half.

In an example embodiment, a frequency of the first radar signal and a frequency of the second radar signal increase with time in a unit of time; or a frequency of the first radar signal and a frequency of the second radar signal decrease with time in a unit of time. Alternatively, expression may be as follows: A sign of a slope of a frequency of the first radar signal is the same as a sign of a slope of a frequency of the second radar signal. That is, the frequency of the first radar signal and the frequency of the second radar signal may be increased or decreased at the same time.

In an example embodiment, frequency variations of the first radar signal and the second radar signal in the unit of time are the same. Alternatively, expression may be as follows: The slope of the frequency of the first radar signal is the same as the slope of the frequency of the second radar signal. Alternatively, expression may be as follows: In the unit of time, an absolute value of a variation by which the frequency of the first radar signal changes with time is the same as an absolute value of a variation by which the frequency of the second radar signal changes with time. In other words, the absolute value of the variation of the frequency of the first radar signal may be the same as the absolute value of the variation of the frequency of the second radar signal.

According to a non-limiting third aspect of an example embodiment, a radar signal processing apparatus is provided, and is applied to the radar signal processing method according to the first aspect and the possible implementations of the first aspect.

According to a non-limiting fourth aspect of an example embodiment, a storage medium is provided. The storage medium stores a computer program, and when the computer program is executed by a processor, the radar signal processing method according to the first aspect and the possible implementations of the first aspect is implemented.

According to a non-limiting fifth aspect of an example embodiment, a radar signal processing apparatus is provided, and includes a processor and a memory. The memory is configured to store a program, and the processor invokes the program stored in the memory, to perform the radar signal processing method according to the first aspect and the possible implementations of the first aspect.

According to a sixth aspect, an embodiment of this application provides a computer program product. When the computer program product runs on a control apparatus, a radar signal processing apparatus is enabled to perform the radar signal processing method according to the first aspect and the possible implementations of the first aspect.

According to a seventh aspect, an embodiment of this application provides a chip system, including a processor, configured to support a radar signal processing apparatus in performing the radar signal processing method according to the first aspect and the possible implementations of the first aspect.

For technical effects of the second aspect to the seventh aspect, refer to the content described in the first aspect and the possible implementations of the first aspect.

DESCRIPTION OF EXAMPLE EMBODIMENTS

Radars in the embodiments of this application may be applied to vehicle-to-everything (V2X), vehicle-to-vehicle (V2V) communication, vehicle-to-infrastructure (V2I) communication, vehicle-to-pedestrian (V2P) communication, and the like. An application scenario of radars is not limited in embodiments of this application.

Figure 1:
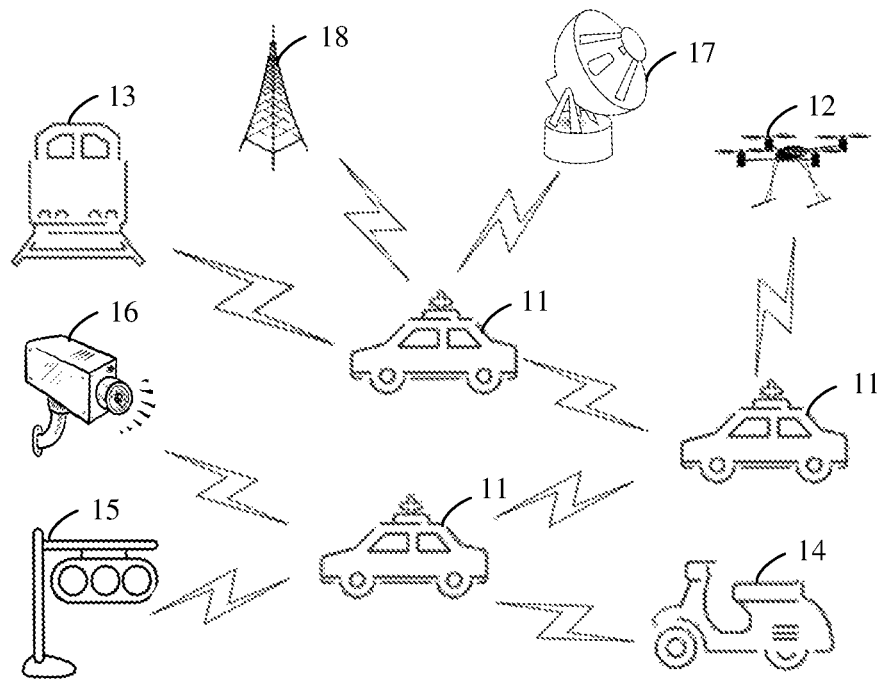
FIG. 1 is a schematic diagram of a radar system according to an embodiment of this application.

As shown in FIG. 1, the radar in the embodiments of this application may be installed on a motor vehicle 11, an unmanned aerial vehicle 12, a railway vehicle 13, a bicycle 14, a signal light 15, a velocity measurement apparatus 16, a radar station 17, a base station 18, or the like. A position at which the radar is installed and a specific field to which the radar is applied are not limited in embodiments of this application. In addition, it should be noted that the radar in the embodiments of this application may also be referred to as a detector or a detection apparatus. A working principle of the radar is to detect a corresponding target object by transmitting a signal (or referred to as a detection signal) and receiving a reflected signal obtained after reflection by the target object. The signal may be a radio signal or an electromagnetic wave signal. For ease of description, the signals may be collectively referred to as a radar signal. Further, the radar signal is periodically transmitted. For example, for a sawtooth wave, a duration of a complete sawtooth waveform may be understood as a transmission period of a sawtooth wave radar signal. For another example, for a triangular wave, a duration of a complete triangular waveform may be understood as a transmission period of a triangular wave radar signal.

The radars in the embodiments of this application may be applied to radar velocity measurement, ranging, angle measurement, and the like between vehicles, between a vehicle and an unmanned aerial vehicle, and between other apparatuses. For example, the radars may be applied to adaptive cruise control (ACC), autonomous emergency braking (AEB), lane change assist (LCA), blind spot monitoring (BSM), parking assistance (PA), and/or pedestrian detection (PD). A function to which a radar is applied is not limited in embodiments of this application.

The radars in the embodiments of this application may be a millimeter-wave (mmWave) radar, a micrometer-wave radar, or the like. An attribute of an electromagnetic wave transmitted by any of the radars is not limited in embodiments of this application.

For example, a millimeter wave refers to an electromagnetic wave with a wavelength of 1 mm to 10 mm, and corresponds to a frequency range of 30 GHz to 300 GHz. Millimeter wave-related features are quite suitable for application to the vehicle-mounted field. High bandwidth means abundant frequency domain resources and a low antenna side lobe, thereby facilitating imaging or quasi-imaging. A small wavelength means a reduced size of a radar device and a reduced antenna diameter, and therefore a weight is reduced. A narrow beam means that in the case of a same antenna size, a millimeter-wave beam is much narrower than a micrometer-wave beam, and therefore there is high radar resolution. Strong penetration means that compared with laser radar and an optical system, the millimeter-wave radar has a better capability of penetrating smoke, dust, and fog, and can work around the clock.

Figure 2:
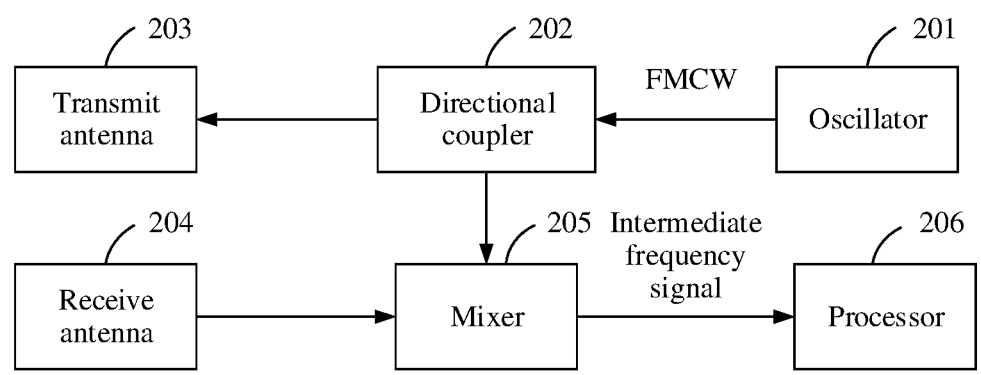
FIG. 2 is a schematic structural diagram of radar according to an embodiment of this application.

As shown in FIG. 2, an embodiment of this application provides a radar. The radar includes an oscillator 201, a directional coupler 202, a transmit antenna 203, a receive antenna 204, a mixer 205, and a processor 206. To clearly describe the solutions, in this embodiment of this application, description is provided by using an example in which a radar signal is a frequency modulated continuous wave.

The oscillator 201 generates a frequency modulated continuous wave (FMCW), and outputs the frequency modulated continuous wave to the directional coupler 202.

The frequency modulated continuous wave may be a linear frequency modulated continuous wave. The linear frequency modulated continuous wave is an electromagnetic wave whose frequency linearly increases or decreases with time. That is, in a time unit, the frequency of the frequency modulated continuous wave is in a linear relationship with time. Alternatively, in a unit of time, absolute values of frequency variations of the frequency modulated continuous wave are the same (for a sawtooth wave, frequency variations are the same; and for a triangular wave, absolute values of frequency variations of a rising edge and a falling edge are the same). In this embodiment, a slope of the frequency of the frequency modulated continuous wave is a slope of the linear relationship between the frequency of the frequency modulated continuous wave and time (for details, refer to FIG. 4). A sign of the slope is used to indicate whether the slope is a positive slope or a negative slope. When the frequency linearly increases with time, there is a rising edge, and the sign of the slope is positive. When the frequency linearly decreases with time, there is a falling edge, and the sign of the slope is negative. In this embodiment of this application, for example, a linear frequency modulated continuous wave is used for description, but there is no limitation that the frequency modulated continuous wave needs to be a linear frequency modulated continuous wave.

The directional coupler 202 outputs the frequency modulated continuous wave to the mixer 205 as a local-frequency signal, and outputs the frequency modulated continuous wave to the transmit antenna 203, and the transmit antenna 203 transmits the frequency modulated continuous wave. A reflected wave of the frequency modulated continuous wave is obtained after the frequency modulated continuous wave is reflected by a target object.

The receive antenna 204 receives the reflected wave of the frequency modulated continuous wave, and then outputs the reflected wave to the mixer 205.

The mixer 205 mixes the frequency modulated continuous wave and the reflected wave of the frequency modulated continuous wave to obtain an intermediate frequency (IF) signal. The intermediate frequency signal is a signal formed by a difference between frequencies of the frequency modulated continuous wave and the reflected wave of the frequency modulated continuous wave at a same moment. That is, a frequency of the intermediate frequency signal is the difference between the frequencies of the frequency modulated continuous wave and the reflected wave of the frequency modulated continuous wave at the same moment.

The mixer 205 filters, by using a low-pass filter, the intermediate frequency signal obtained through mixing, and then amplifies and outputs the intermediate frequency signal to the processor 206. The processor 206 processes the intermediate frequency signal (for example, performs fast Fourier transformation and spectrum analysis on the intermediate frequency signal), to obtain at least one of range information, velocity information, and angle information of the target object.

In this embodiment of this application, the range information, the velocity information, and the angle information of the target object, or a range, a velocity, and an angle of the target object, or a relative range, a relative velocity, and a relative angle of the target object are all relative to the radar that transmits the frequency modulated continuous wave. A specific name is not limited in embodiments of this application.

It should be noted that when the radar is installed on a vehicle, the processor 206 may send the at least one of the range information, the velocity information, and the angle information of the target object to a controller on the vehicle to control the vehicle.

A waveform of the frequency modulated continuous wave is usually a sawtooth wave or a triangular wave. The following describes a working principle of the radar in detail by using an example in which the frequency modulated continuous wave is a triangular wave.

Figure 3:
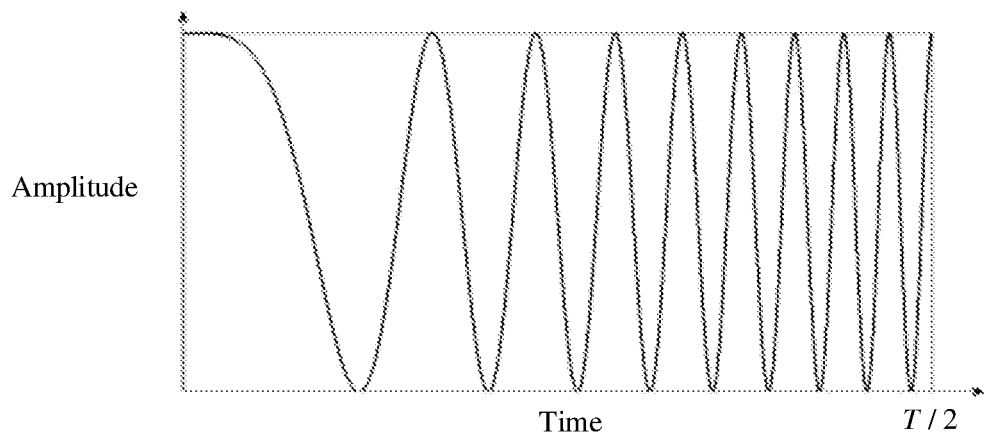
FIG. 3 is a schematic diagram of a time amplitude of a frequency modulated continuous wave in a triangular wave form according to an embodiment of this application.
Figure 4:
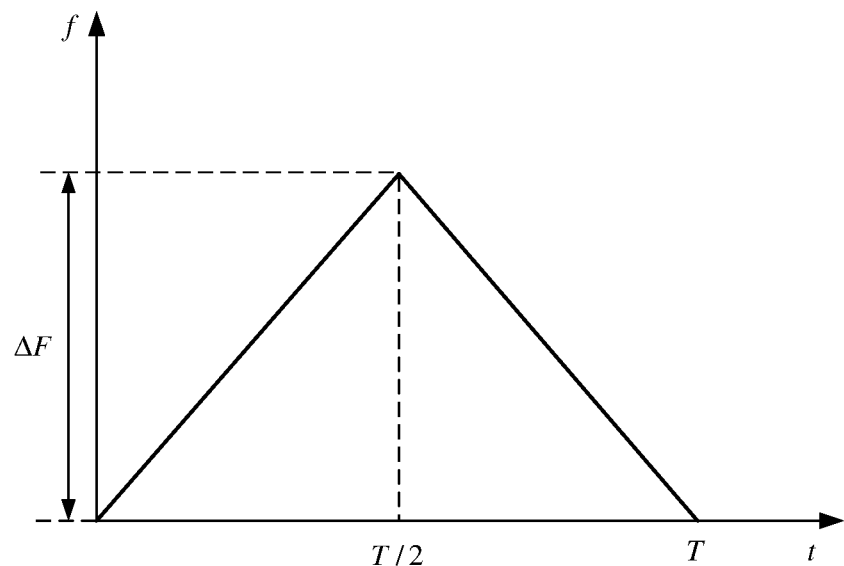
FIG. 4 is a schematic diagram of a time frequency of a frequency modulated continuous wave in a triangular wave form according to an embodiment of this application.

FIG. 3 is a schematic diagram of a time amplitude of a frequency modulated continuous wave in a triangular wave form according to an embodiment. A frequency of the frequency modulated continuous wave gradually increases with time in a time unit [0, T/2], and an amplitude of the frequency modulated continuous wave remains unchanged, where T is a period of the triangular wave. FIG. 4 is a schematic diagram of a time frequency of a frequency modulated continuous wave in a triangular wave form. A frequency of the frequency modulated continuous wave linearly increases with time by ΔF in a time unit [0, T/2], and the frequency of the frequency modulated continuous wave linearly decreases with time by ΔF in a time unit [T/2, T], where ΔF is a maximum variation range of the frequency of the frequency modulated continuous wave.

Figure 5:
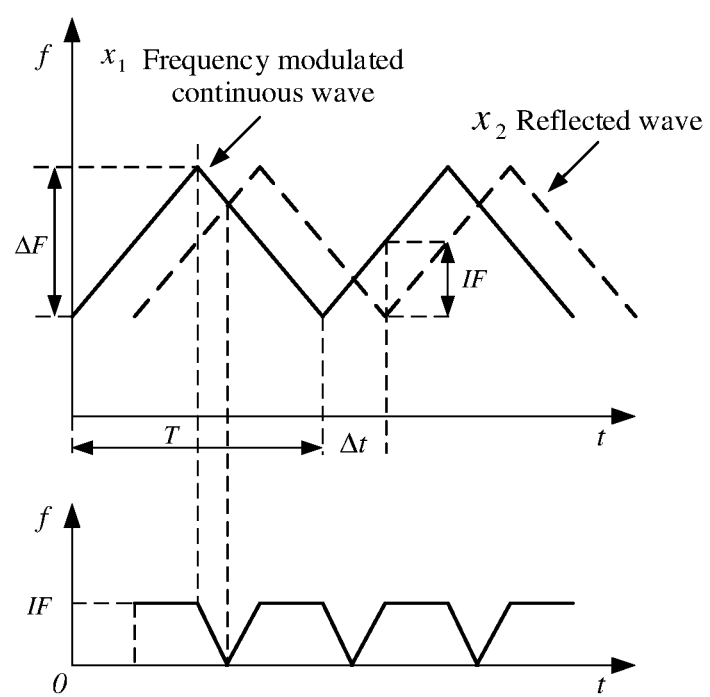
FIG. 5 is a schematic diagram of a frequency modulated continuous wave and a reflected wave of a relatively static target object according to an embodiment of this application.

As shown in FIG. 5, if the target object is relatively static relative to the radar, the frequency modulated continuous wave and the reflected wave of the frequency modulated continuous wave are of a same shape, but there is a delay Δt.

The frequency modulated continuous wave x is as follows:

$$x_1 = \sin(\omega_1(t) \cdot t + \varphi_1) \quad \text{Formula 1; and}$$

the reflected wave $x_2$ of the frequency modulated continuous wave is as follows:

$$x_2 = \sin(\omega_2(t) \cdot t + \varphi_2) \quad \text{Formula 2, where}$$

$\omega_1(t)$ is an angular velocity of the frequency modulated continuous wave $x_1$, $\varphi_1$ is an initial phase of the frequency modulated continuous wave $x_1$, $\omega_2(t)$ is an angular velocity of the frequency modulated continuous wave $x_2$, and $\varphi_2$ is an initial phase of the reflected wave $x_2$ of the frequency modulated continuous wave.

The delay Δt between the frequency modulated continuous wave and the reflected wave $x_2$ of the frequency modulated continuous wave and the range R of the target object meet the following condition:

$$\Delta t = \frac{2R}{c}, \qquad \text{Formula 3}$$

where
c is the speed of light.

The frequency modulated continuous wave and the reflected wave of the frequency modulated continuous wave are mixed in the mixer 205, and the obtained intermediate frequency signal $x_{out}$ is as follows:

$$x_{out} = \sin[(\omega_1(t) - \omega_2(t)) \cdot t + (\varphi_1 - \varphi_2)]. \qquad \text{Formula 4}$$

In addition, as shown in FIG. 5, the frequency IF of the intermediate frequency signal is a product of the slope s of the frequency of the frequency modulated continuous wave and the delay $\Delta t$:

$$IF = s \cdot \Delta t = \frac{\Delta F}{T/2} \cdot \frac{2R}{c} = \frac{4R}{cT} \Delta F, \qquad \text{Formula 5}$$

where
T is the period of the triangular wave, and $\Delta F$ is the maximum variation range of the frequency modulated continuous wave.

Therefore, the range R of the target object is as follows:

$$R = \frac{cT}{4\Delta F} IF. \qquad \text{Formula 6}$$

It may be learned from the foregoing deduction that for the target object that is relatively static relative to the radar, there is a linear relationship between the difference (the frequency IF of the intermediate frequency signal) between the frequencies of the frequency modulated continuous wave and the reflected wave of the frequency modulated continuous wave at the same moment and the delay $\Delta t$ between the frequency modulated continuous wave and the reflected wave of the frequency modulated continuous wave. That is, a longer range of the target object indicates a longer time for the radar to receive the reflected wave of the frequency modulated continuous wave and a larger difference (the frequency IF of the intermediate frequency signal) between the frequencies of the frequency modulated continuous wave and the reflected wave of the frequency modulated continuous wave at the same moment. Therefore, the range of the target object may be obtained by determining the frequency IF of the intermediate frequency signal.

Figure 6:
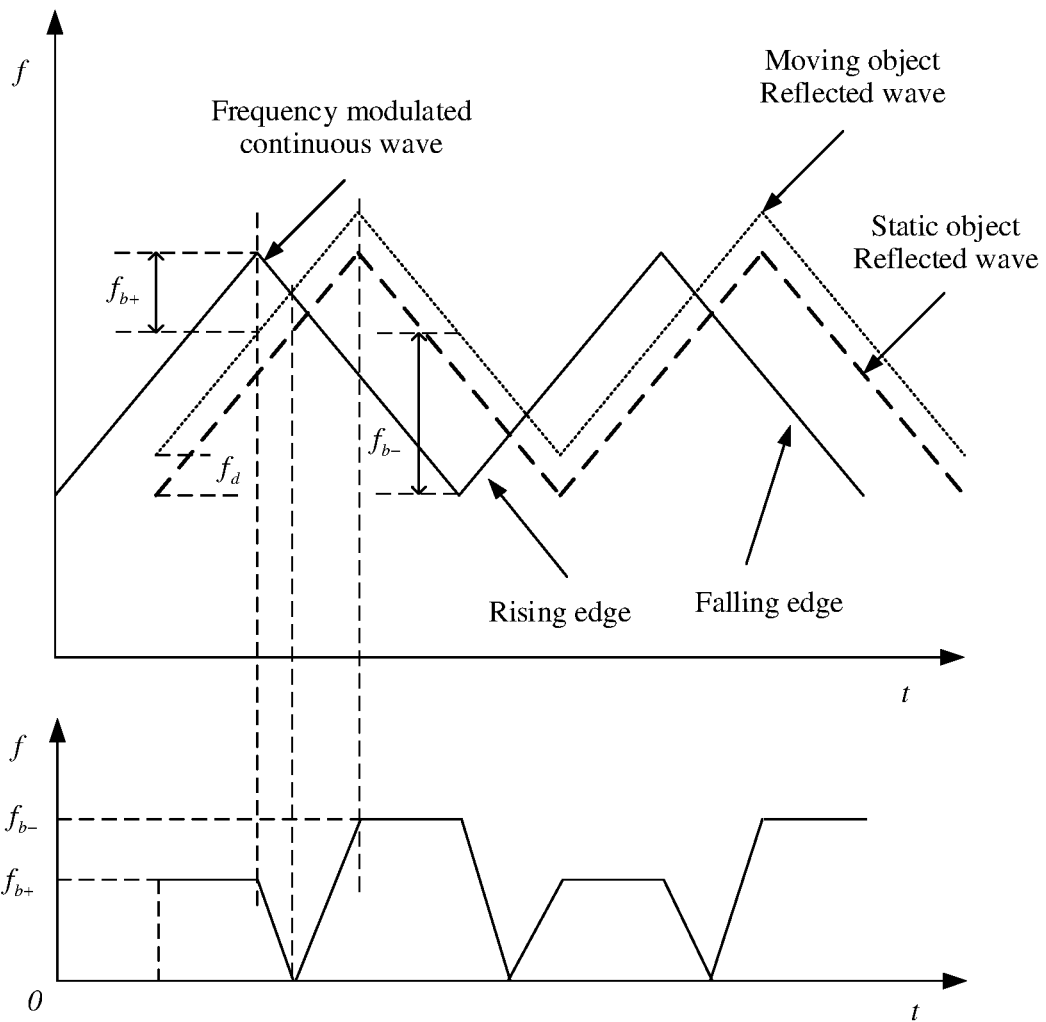
FIG. 6 is a schematic diagram of a frequency modulated continuous wave and a reflected wave of a target object in relative motion according to an embodiment of this application.

As shown in FIG. 6, if the target object is in relative motion relative to the radar, the frequency of the reflected wave of the frequency modulated continuous wave includes a Doppler frequency shift $f_d$ caused by relative motion of the target object.

Therefore, a frequency $f_{b+}$ of an intermediate frequency signal corresponding to a rising edge of the triangular wave is as follows:

$$f_{b+} = IF - f_d \qquad \text{Formula 7; and}$$

a frequency $f_{b-}$ of an intermediate frequency signal corresponding to a falling edge of the triangular wave is as follows:

$$f_{b-} = IF + f_d \qquad \text{Formula 8, where}$$

IF is a frequency of an intermediate frequency signal obtained when the target object is relatively static relative to the radar, $$f_d = \frac{2fv}{c}$$

is the Doppler frequency shift, a sign of $$f_d = \frac{2fv}{c}$$

is related to a direction of the relative motion of the target object relative to the radar, f is a center frequency of the frequency modulated continuous wave, and v is the velocity of the target object.

Based on the formula 7 and the formula 8, it may be obtained, with reference to the formula 5, that the range R of the target object that is in relative motion relative to the radar is as follows:

$$R = \frac{cT}{8\Delta F}(f_{b-} + f_{b+}); \qquad \text{Formula 9}$$

and
it may also be obtained that the velocity of the target object that is in relative motion relative to the radar is as follows:

$$v = \frac{c}{4f}(f_{b-} - f_{b+}). \qquad \text{Formula 10}$$

It may be learned from the foregoing deduction that for the target object that is in relative motion relative to the radar, the range information or the velocity information of the target object may be obtained by detecting the frequency $f_{b+}$ of the intermediate frequency signal of the rising edge of the triangular wave and the frequency $f_{b-}$ of the intermediate frequency signal of the falling edge of the triangular wave.

The working principle of the radar is described in detail below by using an example in which the frequency modulated continuous wave is a sawtooth wave.

Figure 7:
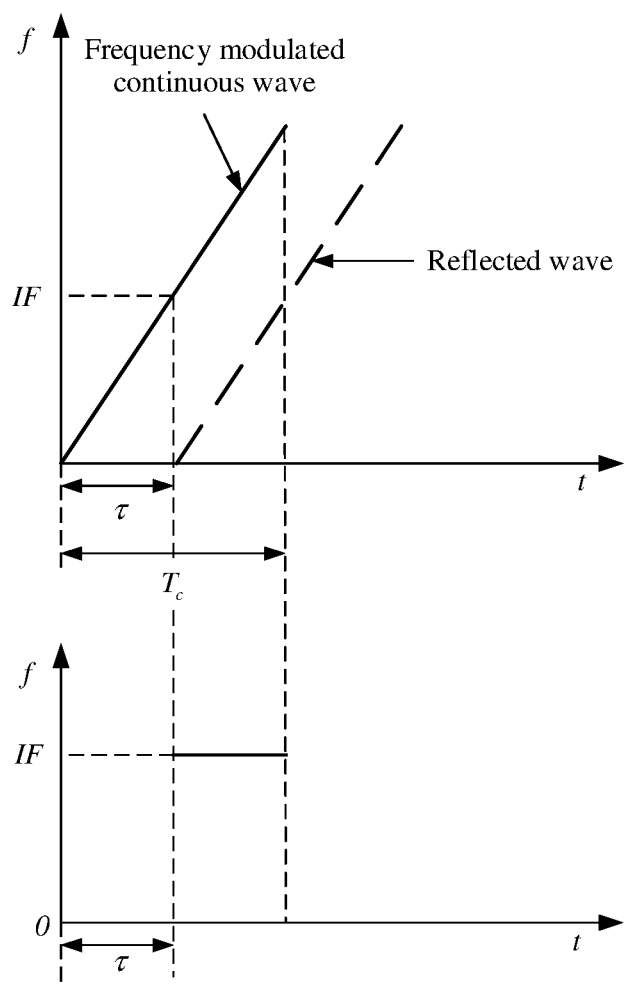
FIG. 7 is a schematic diagram of a ranging principle of a sawtooth wave according to an embodiment of this application.

A ranging principle of a sawtooth wave is similar to that of a triangular wave. As shown in FIG. 7, there is a delay z between the frequency modulated continuous wave and the reflected wave of the frequency modulated continuous wave, and a period of the sawtooth wave is $T_c$.

The frequency modulated continuous wave $x_1$ is as follows:

$$x_1(t) = \sin(\omega_1 t + \phi_1) \qquad \text{Formula 11; and}$$

the reflected wave $x_2$ of the frequency modulated continuous wave is as follows:

$$x_2(t) = \sin(\omega_1(t-\tau) + \phi_1) = \sin(\omega_1 t - 2\pi f_c \tau + \phi_1) \qquad \text{Formula 12, where}$$

$\omega_1$ is an angular velocity of the frequency modulated continuous wave $x_1$, and $\phi_1$ is an initial phase of the frequency modulated continuous wave $x_1$.

An initial phase $\phi_0$ of the intermediate frequency signal is a difference between a phase of the frequency modulated continuous wave $x_1$ and a phase of the reflected wave $x_2$ of the frequency modulated continuous wave:

$$\phi_0 = 2\pi f_c \tau. \qquad \text{Formula 13}$$

As shown in the formula 3, $$\tau = \frac{2R}{c}.$$

Therefore, it may be further obtained that the initial phase $\phi_0$ of the intermediate frequency signal is as follows:

$$\phi_0 = \frac{4\pi R}{\lambda}. \qquad \text{Formula 14}$$

In this case, the range of the target object is as follows:

$$R = \frac{\lambda \phi_0}{4\pi}, \qquad \text{Formula 15}$$

where $$\lambda = \frac{c}{f_c}$$

is a wavelength of the frequency modulated continuous wave, R is the range of the target object, and $f_c$ is a center frequency of the frequency modulated continuous wave.

It may be learned from the foregoing deduction that the relative range between the target object and the radar may be obtained by detecting the phase of the intermediate frequency signal.

Figure 8:
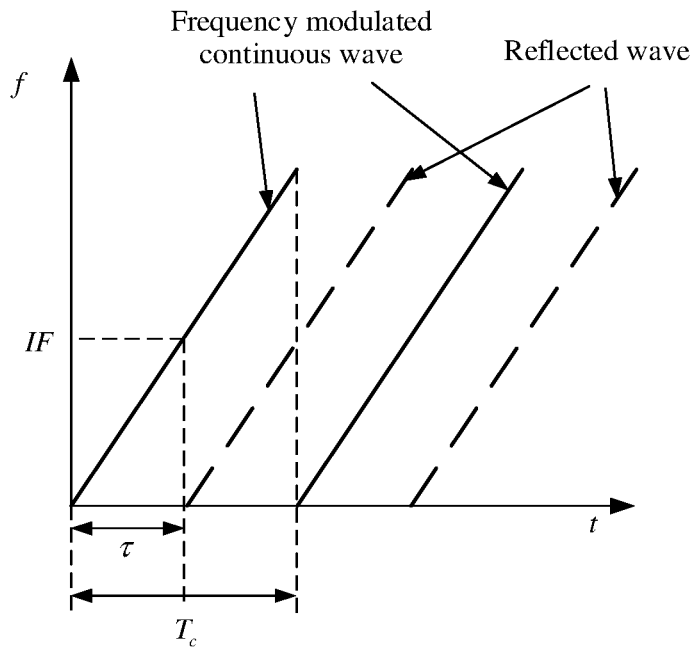
FIG. 8 is a schematic diagram of a velocity measurement principle of a sawtooth wave according to an embodiment of this application.

To measure the velocity of the object, as shown in FIG. 8, the radar transmits two frequency modulated continuous waves at a time interval $T_c$, and receives reflected waves of the two frequency modulated continuous waves, to obtain two intermediate frequency signals. The target object moves by a range of $\Delta R = v T_c$ in the time $T_c$, where v is a moving velocity of the target object. Therefore, a phase difference $\Delta\phi$ that is between the two intermediate frequency signals and that is obtained based on the formula 14 is as follows:

$$\Delta\phi = \frac{4\pi \Delta R}{\lambda} = \frac{4\pi v T_c}{\lambda}, \qquad \text{Formula 16}$$

where $\lambda$ is a wavelength of the frequency modulated continuous wave. Therefore, the velocity v of the target object is as follows:

$$v = \frac{\lambda \Delta \phi}{4\pi T_c}. \qquad \text{Formula 17}$$

Figure 9:
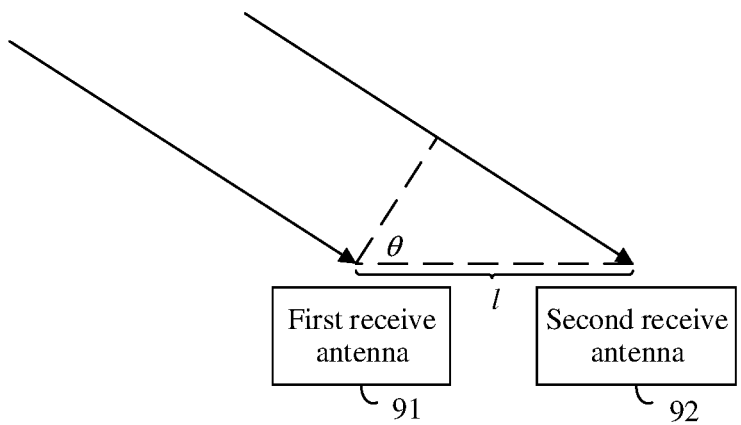
FIG. 9 is a schematic diagram of an angle measurement principle of a sawtooth wave according to an embodiment of this application.

An angle measurement principle of the radar is also an extension of the ranging principle. As shown in FIG. 9, the radar may include a first receive antenna 91 and a second receive antenna 92. A range between the two receive antennas is l. The reflected wave of the frequency modulated continuous wave arrives at the two receive antennas at different ranges. The range l between the two receive antennas is far less than the range between the target object and the radar. Therefore, directions of the reflected waves received by the two receive antennas may be approximately parallel, and two intermediate frequency signals may be obtained. It is obtained, based on the ranging principle, that phases of the two intermediate frequency signals are different, and a transmission angle may be derived based on a difference between the phases of the two intermediate frequency signals.

According to the formula 16, the difference between the phases of the two intermediate frequency signals is $$\Delta\phi = \frac{4\pi \Delta R}{\lambda},$$

and $\Delta R = l \sin(\theta)$. Therefore, it is obtained that the angle $\theta$ of the target object is as follows:

$$\theta = \sin^{-1}\left(\frac{\lambda \Delta \phi}{2\pi l}\right). \qquad \text{Formula 18}$$

In the embodiments of this application, two frequency modulated continuous waves may be transmitted on different frequency bands by using same radar, reflected waves of the two frequency modulated continuous waves are correspondingly received, and intermediate frequency signals corresponding to the two frequency modulated continuous waves are obtained by using the method described above, to obtain at least one of range information, velocity information, and angle information of a target object.

It should be noted that a frequency band in the embodiments of this application may be replaced with a frequency range. If two frequency bands are the same, it indicates that bandwidth, a minimum frequency, and a maximum frequency of the two frequency bands are the same.

Figure 10:
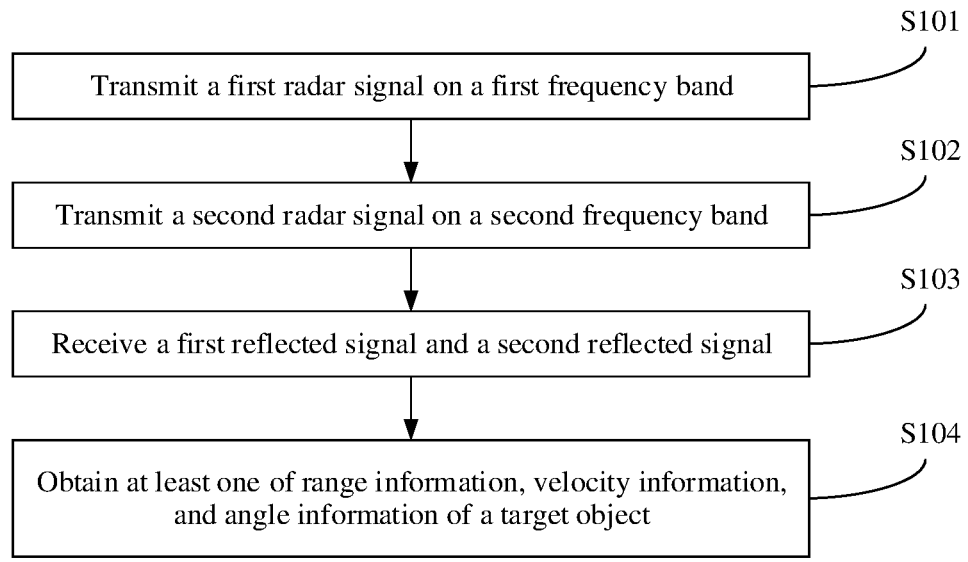
FIG. 10 is a schematic flowchart of a radar signal processing method according to an embodiment of this application.

An embodiment of this application provides a radar signal processing method. The method is applied to a first apparatus. The first apparatus may be the radar described above or another apparatus with a control function, and the apparatus may be independent of or integrated into radar. As shown in FIG. 10, the radar signal processing method includes the following steps.

S101. Transmit a first radar signal on a first frequency band.

Optionally, the first radar signal may be a first frequency modulated continuous wave.

In an example embodiment, an initial frequency of the first radar signal is a minimum frequency of the first frequency band. In this embodiment, transmit power of the first radar signal increases with time.

In another example embodiment, an initial frequency of the first radar signal is a maximum frequency of the first frequency band. In this embodiment, transmit power of the first radar signal decreases with time.

Optionally, the first radar signal is transmitted in a first time unit. Further, optionally, an initial moment for transmitting the first radar signal is a start moment of the first time unit.

S102. Transmit a second radar signal on a second frequency band.

Optionally, the second radar signal is a second frequency modulated continuous wave.

In an example embodiment, an initial frequency of the second radar signal is a minimum frequency of the second frequency band. In this embodiment, transmit power of the second radar signal increases with time.

In another example embodiment, an initial frequency of the second radar signal is a maximum frequency of the second frequency band. In this embodiment, transmit power of the second radar signal decreases with time.

Optionally, the second radar signal is transmitted in the first time unit. Further, optionally, an initial moment for transmitting the second radar signal is the start moment of the first time unit.

Figure 11:
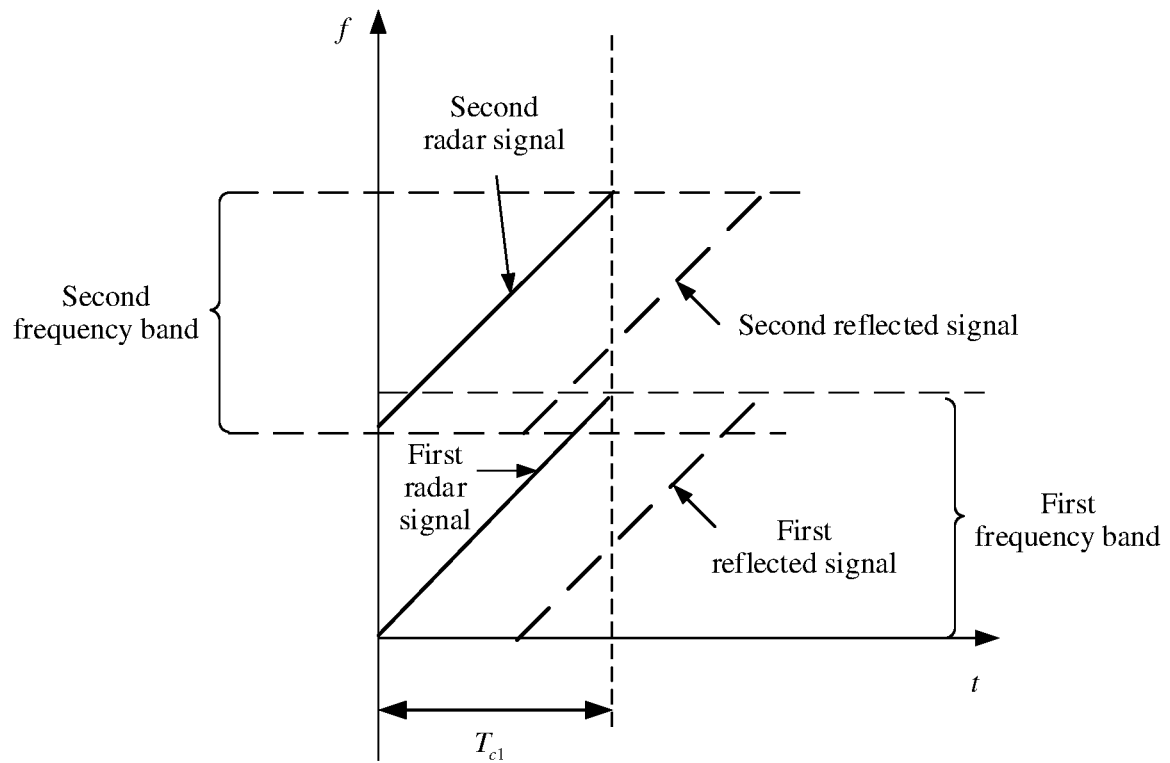
FIG. 11 is a schematic diagram 1 of a radar signal and a reflected signal according to an embodiment of this application.

In an example embodiment, the first frequency band and the second frequency band may not completely overlap in frequency domain, as shown in FIG. 11. Herein, that the first frequency band and the second frequency band do not completely overlap means that the first frequency band is different from the second frequency band, and any one of the frequency bands is not included in the other frequency band. Specifically, as shown in FIG. 12, the first frequency band and the second frequency band do not overlap at all in frequency domain.

Figure 12:
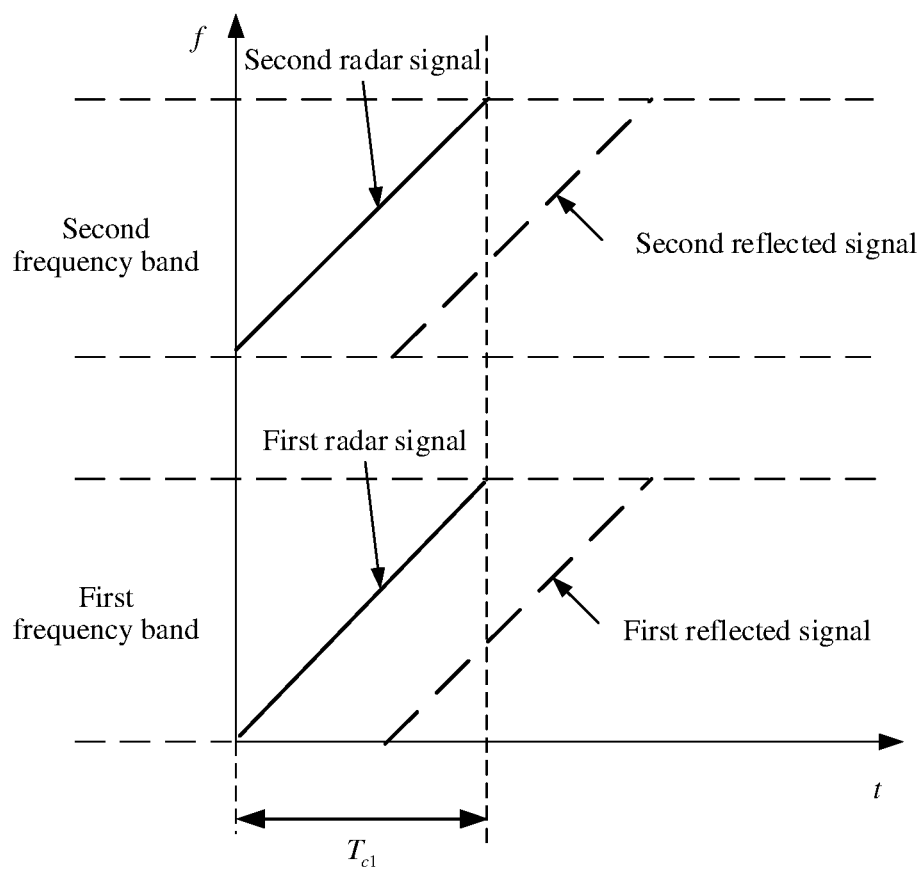
FIG. 12 is a schematic diagram 2 of a radar signal and a reflected signal according to an embodiment of this application.

In an example embodiment, as shown in FIG. 11 and FIG. 12, the first radar signal and the second radar signal are transmitted in a first time unit $T_{c1}$ a duration of the first radar signal may be the same as a duration of the second radar signal, and a length of the first time unit $T_{c1}$ is equal to the duration. For example, the first time unit is a frequency sweep time period of the first radar signal and the second radar signal. Herein, it should be noted that the first time unit may alternatively be understood as a "frequency sweep period", namely, a time unit in which both the first radar signal and the second radar signal complete frequency sweep. Further, the first time unit may be understood as each frequency sweep period.

Figure 13:
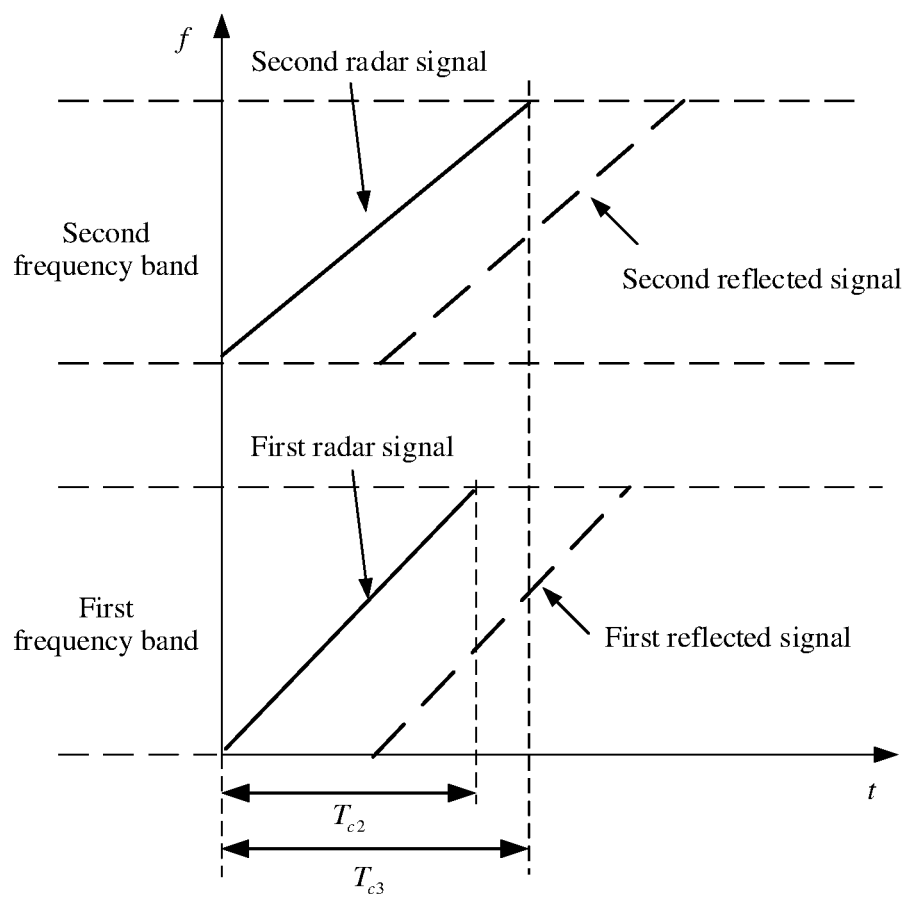
FIG. 13 is a schematic diagram 3 of a radar signal and a reflected signal according to an embodiment of this application.

In another embodiment, as shown in FIG. 13, a duration of the first radar signal may be different from a duration of the second radar signal. For example, the first radar signal is transmitted in a second time unit $T_{c2}$, and a length of the second time unit $T_{c2}$ is equal to the duration of the first radar signal; and the second radar signal is transmitted in a third time unit $T_{c3}$, and a length of the third time unit $T_{c3}$ is equal to the duration of the second radar signal, where $T_{c2} \neq T_{c3}$. Further, the length of the first time unit $T_{c1}$ is greater than or equal to the length of the second time unit $T_{c2}$, and is greater than or equal to the length of the third time unit $T_{c3}$.

It should be noted that the duration may also be referred to as a frequency sweep time period or the like. A specific name is not limited in embodiments of this application. A linear frequency modulated continuous wave is used as an example. In each transmission period, a signal is transmitted from an initial frequency, and the initial frequency linearly increases to a maximum frequency in the transmission period (or linearly decreases to a minimum frequency in the transmission period) after a specific duration. The duration may be referred to as a frequency sweep time period of the linear frequency modulated continuous wave. Optionally, for a frequency modulated continuous wave that is periodically transmitted, the duration or the frequency sweep time period may be one transmission period or half a transmission period. For example, for a sawtooth wave, the duration or the frequency sweep time period may be a time length or a quantity of symbols of one period; and for a triangular wave, the duration or the frequency sweep time period may be half a time length or half a quantity of symbols of one period, namely, half a period.

A feature "unit of time" is introduced in the following embodiments. The unit of time may be the first time unit, or may be any time period that is used as a calculation unit and that is in the first time unit, for example, one symbol, a plurality of symbols, one slot, or one subframe. The unit of time is not specifically limited in this embodiment provided that a changing relationship between a frequency of a radar signal or a frequency modulated continuous wave and time is clearly described.

Figure 14:
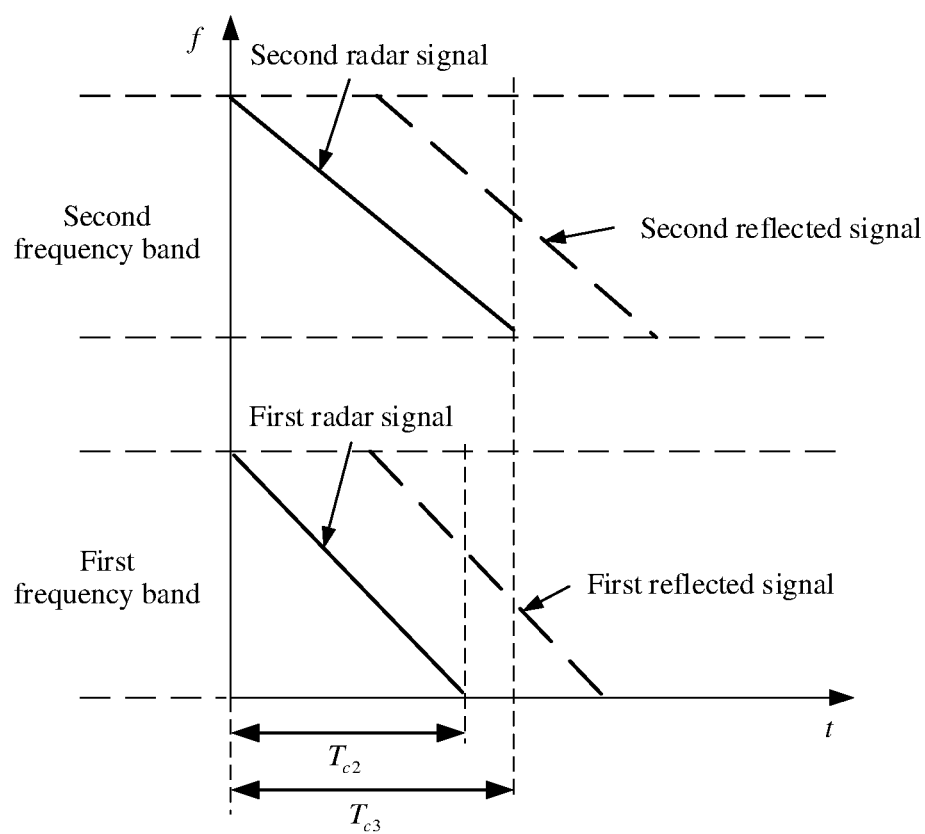
FIG. 14 is a schematic diagram 4 of a radar signal and a reflected signal according to an embodiment of this application.

In an example embodiment, a sign of a slope of a frequency of the first radar signal is the same as a sign of a slope of a frequency of the second radar signal. The slope herein may be described as a variation of a frequency of a linear frequency modulated continuous wave in a unit of time. Alternatively, frequencies of the first radar signal and the second radar signal increase with time in a unit of time, or frequencies of the first radar signal and the second radar signal decrease with time in a unit of time. For example, as shown in FIG. 11 to FIG. 13, in a unit of time, the frequency of the first radar signal and the frequency of the second radar signal linearly increase with time, and a frequency variation is a positive value. Alternatively, as shown in FIG. 14, in a unit of time, the frequency of the first radar signal and the frequency of the second radar signal decrease linearly with time, and a frequency variation is a negative value.

In an example embodiment, an absolute value of a slope of a frequency of the first radar signal is the same as an absolute value of a slope of a frequency of the second radar signal. Alternatively, in a unit of time, an absolute value of a frequency variation of the first radar signal is the same as an absolute value of a frequency variation of the second radar signal.

Further, the first radar signal and the second radar signal are transmitted by using the start moment of the first time unit as the initial moment, and the frequencies of the first radar signal and the second radar signal change by a same frequency variation in a unit of time. It may be understood that the first radar signal and the second radar signal are respectively transmitted on the first frequency band and the second frequency band, but have a same waveform in the first time unit. Further, the duration of the first radar signal is the same as the duration of the second radar signal (both the duration of the first radar signal and the duration of the second radar signal are the length of the first time unit). In this case, the first radar signal and the second radar signal may be periodically transmitted on the respective frequency bands by using the length of the first time unit as a period.

In this embodiment, optionally, the slope of the frequency of the first radar signal is the same as the slope of the frequency of the second radar signal. Alternatively, the frequency variations of the first radar signal and the second radar signal in the unit of time are the same. For example, both the slope of the frequency of the first radar signal and the slope of the frequency of the second radar signal are 1.

Figure 15:
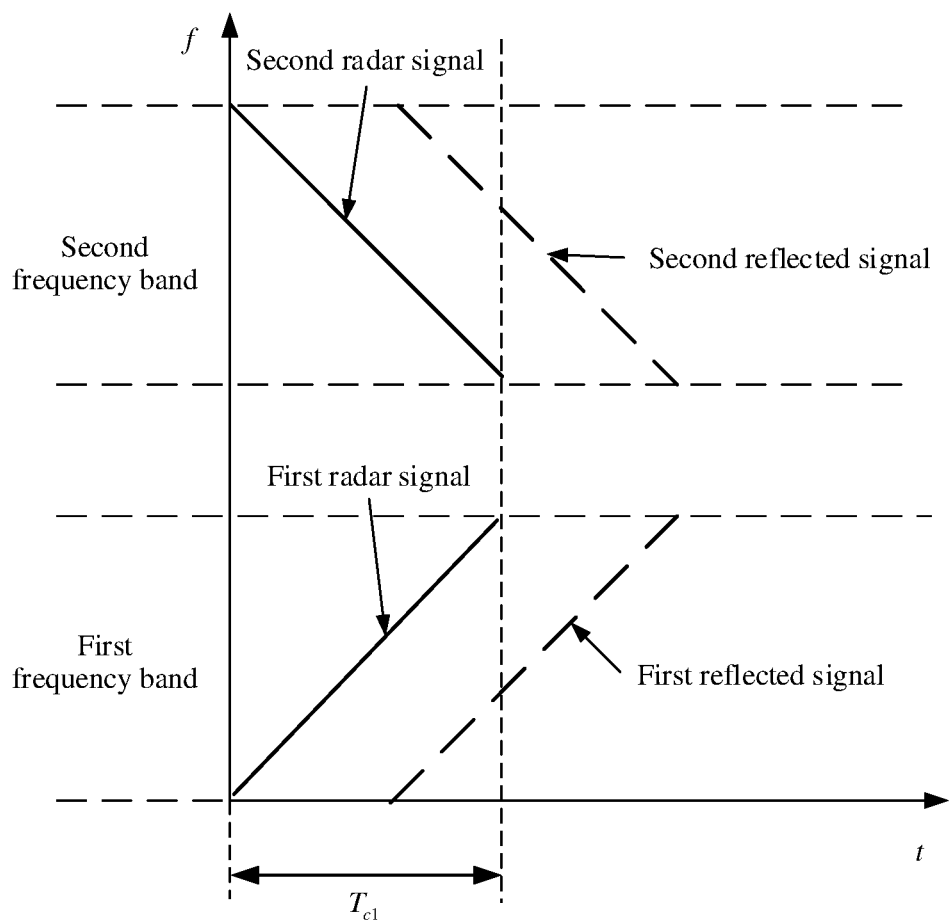
FIG. 15 is a schematic diagram 5 of a radar signal and a reflected signal according to an embodiment of this application.
Figure 16:
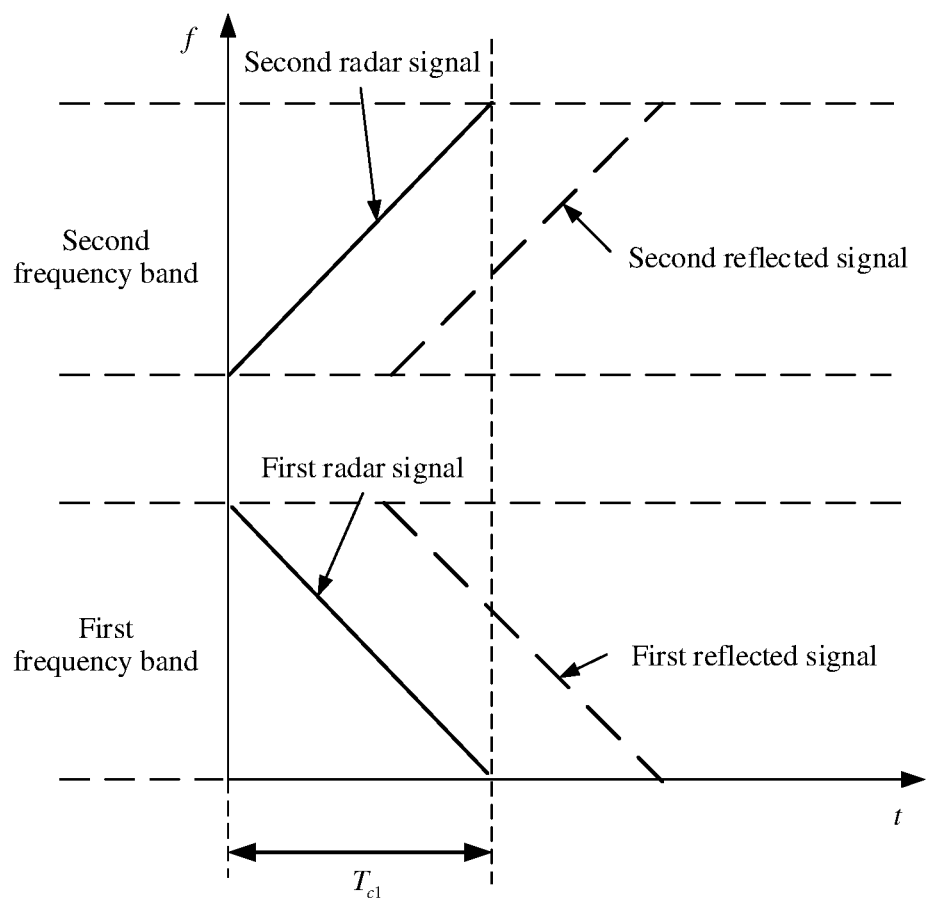
FIG. 16 is a schematic diagram 6 of a radar signal and a reflected signal according to an embodiment of this application.
Figure 17:
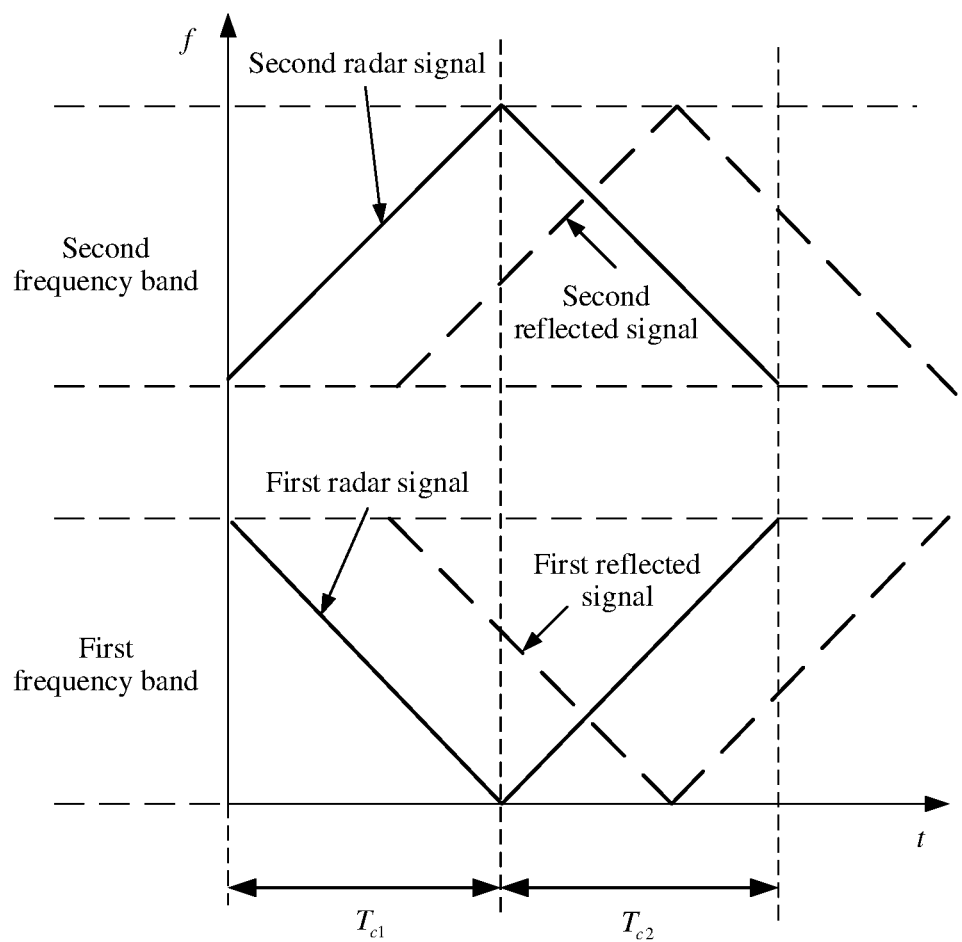
FIG. 17 is a schematic diagram 7 of a radar signal and a reflected signal according to an embodiment of this application.
Figure 18:
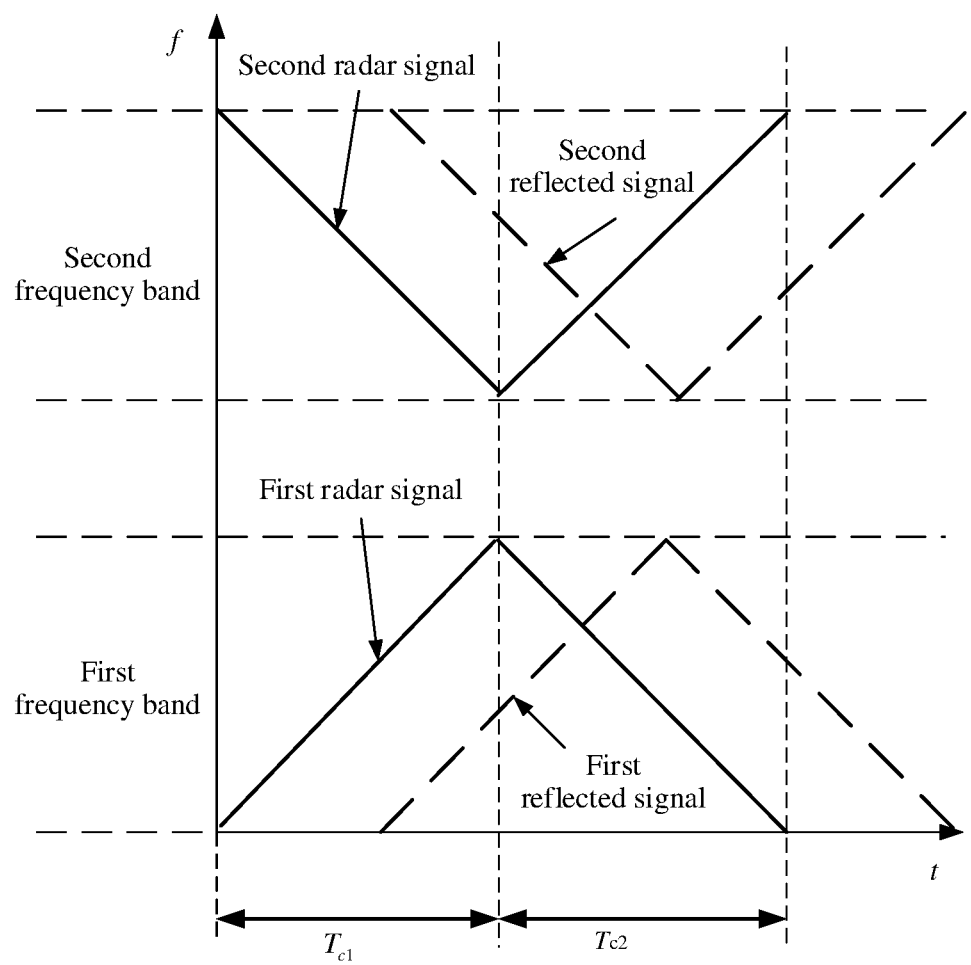
FIG. 18 is a schematic diagram 8 of a radar signal and a reflected signal according to an embodiment of this application.

In this embodiment, still optionally, the slope of the frequency of the first radar signal and the slope of the frequency of the second radar signal are opposite in sign. Alternatively, the frequency variations of the first radar signal and the second radar signal in the unit of time are opposites. For example, as shown in FIG. 15, the frequency of the first radar signal linearly increases with time, and the frequency of the second radar signal linearly decreases with time. In this case, a sign of the slope of the frequency of the first radar signal is positive, and a sign of the slope of the frequency of the second radar signal is negative. Alternatively, as shown in FIG. 16, within a time unit $T_{c1}$, the frequency of the first radar signal linearly decreases with time, and the frequency of the second radar signal linearly increases with time. In this case, a sign of the slope of the frequency of the first radar signal is negative, and a sign of the slope of the frequency of the second radar signal is positive. Alternatively, as shown in FIG. 17, in a previous time unit $T_{c1}$, the frequency of the first radar signal linearly decreases with time, and the frequency of the second radar signal linearly increases with time; and in a current time unit $T_{c2}$, the frequency of the first radar signal linearly increases with time, and the frequency of the second radar signal linearly decreases with time. Alternatively, as shown in FIG. 18, in a previous time unit $T_{c1}$, the frequency of the first radar signal linearly increases with time, and the frequency of the second radar signal linearly decreases with time; and in a current time unit $T_{c2}$, the frequency of the first radar signal linearly decreases with time, and the frequency of the second radar signal linearly increases with time.

When the slope of the frequency of the first radar signal and the slope of the frequency of the second radar signal are opposite in sign, a rising edge and a falling edge of a triangular wave may be sent in one time unit, which is different from a case, shown in FIG. 4, in which a rising edge is first sent in a time unit, and then a falling edge is sent in a next time unit. In this case, a time for sending the rising edge and the falling edge of the triangular wave is reduced by half. Correspondingly, a time for receiving a reflected wave of the rising edge and a reflected wave of the falling edge is reduced by half. Therefore, time consumed for measuring range information of a target object by using a formula 9 or measuring velocity information of a target object by using a formula 10 is reduced by half. In addition, resolution of radar for measuring the range information and the velocity information is kept unchanged.

Further, in an example embodiment, a slope of a frequency of the first radar signal and a slope of a frequency of the second radar signal are opposites. For example, the slope of the frequency of the first radar signal is 1, and the slope of the frequency of the second radar signal is −1.

S103. Receive a first reflected signal and a second reflected signal.

The first reflected signal is an electromagnetic wave obtained after the first radar signal or the first frequency modulated continuous wave is reflected by the target object, and the second reflected signal is an electromagnetic wave obtained after the second radar signal or the second frequency modulated continuous wave is reflected by the target object.

S104. Obtain at least one of the range information, the velocity information, and angle information of the target object.

In an example embodiment, the at least one of the range information, the velocity information, and the angle information is obtained based on the first radar signal and the first reflected signal. For example, a first intermediate frequency signal is obtained based on the first radar signal and the first reflected signal; and the at least one of the range information, the velocity information, and the angle information is obtained based on the first intermediate frequency signal.

Alternatively, in another embodiment, the at least one of the range information, the velocity information, and the angle information is obtained based on the second radar signal and the second reflected signal. For example, a second intermediate frequency signal is obtained based on the second radar signal and the second reflected signal; and the at least one of the range information, the velocity information, and the angle information is obtained based on the second intermediate frequency signal.

Alternatively, in still another embodiment, the at least one of the range information, the velocity information, and the angle information is obtained based on the first radar signal, the first reflected signal, the second radar signal, and the second reflected signal. For example, a first intermediate frequency signal is obtained based on the first radar signal and the first reflected signal; a second intermediate frequency signal is obtained based on the second radar signal and the second reflected signal; and the at least one of the range information, the velocity information, and the angle information is obtained based on the first intermediate frequency signal and the second intermediate frequency signal.

For how to obtain the at least one of the range information, the velocity information, and the angle information based on the intermediate frequency signal, refer to the foregoing description. Details are not repeated herein.

According to the radar signal processing method provided in embodiments of this application, two radar signals are transmitted on different frequency bands, and reflected signals of the two radar signals are correspondingly received, to obtain the at least one of the range information, the velocity information, and the angle information of the target object. Radar signals can be transmitted by using inconsecutive frequency domain resources, and therefore frequency sweep bandwidth of radar is expanded. In this way, range resolution of the radar is improved.

An embodiment of this application further provides a radar signal processing apparatus, which may be configured to perform the radar signal processing method in the foregoing implementations. In this embodiment, the radar signal processing apparatus may be divided into function modules based on the foregoing method example. For example, each function module may be obtained through division based on each corresponding function, or two or more functions may be integrated into one processing module. The integrated module may be implemented in a form of hardware, or may be implemented in a form of a software functional module. It should be noted that, in embodiments of this application, module division is exemplary, and is merely a logical function division. In actual implementation, another division manner may be used.

Figure 19:
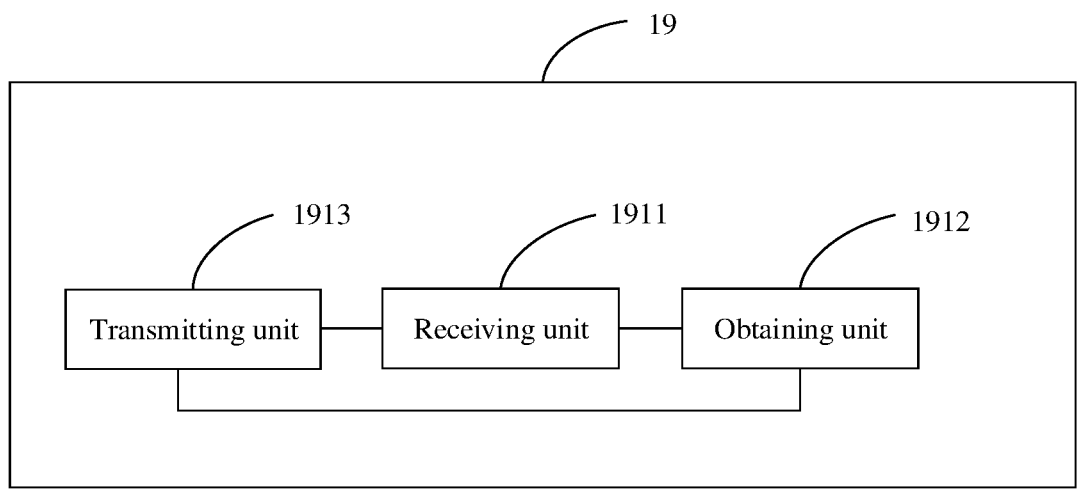
FIG. 19 is a schematic structural diagram 1 of a radar signal processing apparatus according to an embodiment of this application.

When each function module is obtained through division based on each corresponding function, FIG. 19 is a possible schematic structural diagram of a radar signal processing apparatus in the foregoing embodiments. A radar signal processing apparatus 19 may include a receiving unit 1911, an obtaining unit 1912, and a transmitting unit 1913. The units are configured to support the radar signal processing apparatus in performing the related method in FIG. 10. The radar signal processing apparatus provided in embodiments of this application is configured to perform the foregoing radar signal processing methods. Therefore, for corresponding features of the radar signal processing apparatus and beneficial effects that can be achieved by the radar signal processing apparatus, refer to the beneficial effects in the corresponding implementations provided above. Details are not repeated herein.

For example, the receiving unit 1911 is configured to support the radar signal processing apparatus 19 in performing the process S103 in FIG. 10. The obtaining unit 1912 is configured to support the radar signal processing apparatus 19 in performing the process S104 in FIG. 10. The transmitting unit 1913 is configured to support the radar signal processing apparatus 19 in performing the processes S101 and S102 in FIG. 10. All related content of the steps in the foregoing method embodiments may be cited in function description of corresponding function modules. Details are not repeated herein.

In an example embodiment, the transmitting unit 1913 is configured to transmit a first radar signal on a first frequency band. The transmitting unit 1913 is further configured to transmit a second radar signal on a second frequency band. The receiving unit 1911 is configured to receive a first reflected signal and a second reflected signal. The first reflected signal is an electromagnetic wave obtained after the first radar signal is reflected by a target object, and the second reflected signal is an electromagnetic wave obtained after the second radar signal is reflected by the target object. The obtaining unit 1912 is configured to obtain at least one of range information, velocity information, and angle information of the target object.

In an example embodiment, the obtaining unit 1912 is specifically configured to: obtain the at least one of the range information, the velocity information, and the angle information based on the first radar signal and the first reflected signal; or obtain the at least one of the range information, the velocity information, and the angle information based on the second radar signal and the second reflected signal; or obtain the at least one of the range information, the velocity information, and the angle information based on the first radar signal, the first reflected signal, the second radar signal, and the second reflected signal.

In an example embodiment, the first radar signal and the second radar signal are transmitted in a first time unit, a duration of the first radar signal is the same as a duration of the second radar signal, and a length of the first time unit is equal to the duration.

In an example embodiment, the first frequency band and the second frequency band do not completely overlap in the frequency domain.

In an example embodiment, at least one of the first radar signal and the second radar signal is a linear frequency modulated continuous wave, and the linear frequency modulated continuous wave is an electromagnetic wave whose frequency linearly increases or decreases with time.

In an example embodiment, frequency variations of the first radar signal and the second radar signal in a unit of time are opposites.

In an example embodiment, a frequency of the first radar signal and a frequency of the second radar signal increase with time in a unit of time, or a frequency of the first radar signal and a frequency of the second radar signal decrease with time in a unit of time.

In an example embodiment, frequency variations of the first radar signal and the second radar signal in the unit of time are the same.

Figure 20:
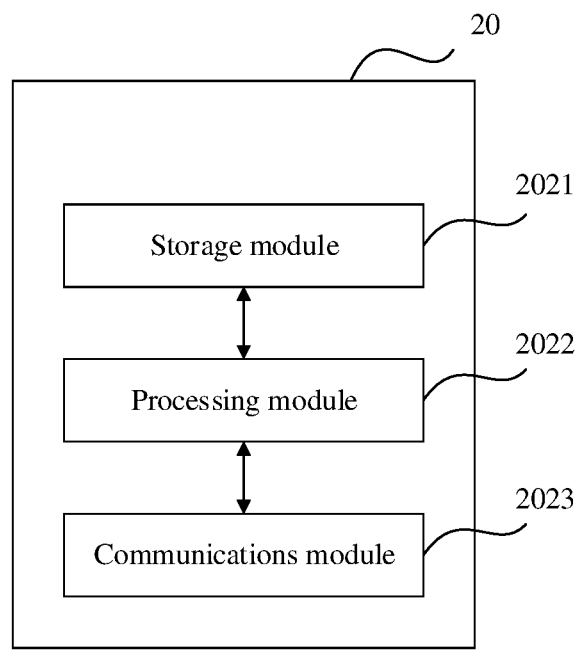
FIG. 20 is a schematic structural diagram 2 of a radar signal processing apparatus according to an embodiment of this application.

FIG. 20 is another possible schematic structural diagram of a radar signal processing apparatus in the foregoing embodiments. A radar signal processing apparatus 20 includes a processing module 2022 and a communications module 2023. Optionally, the radar signal processing apparatus 20 may further include a storage module 2021. The modules are configured to support the radar signal processing apparatus in performing the related method in FIG. 10.

In an example embodiment, the processing module 2022 is configured to: control and manage an action of the radar signal processing apparatus 20, or execute a corresponding processing function, for example, execute a function of the obtaining unit 1912. The communications module 2023 is configured to support a function of communication between the radar signal processing apparatus 20 and another device, for example, execute functions of the receiving unit 1911 and the transmitting unit 1913. The storage module 2021 is configured to store program code and/or data of the radar signal processing apparatus.

The processing module 2022 may be a processor or a controller, such as may be a central processing unit (CPU), a general-purpose processor, a digital signal processor (DSP), an application-specific integrated circuit (ASIC), a field programmable gate array (FPGA), or another programmable logical device, a transistor logical device, a hardware component, or any combination thereof. The processor may implement or execute various example logical blocks, modules, and circuits described with reference to content disclosed in this application. The processor may be a combination of processors implementing a computing function, for example, a combination of one or more microprocessors, or a combination of the DSP and a microprocessor. The communications module 2023 may be a network interface, a communications interface, or the like. The storage module 2021 may be a memory.

Figure 21:
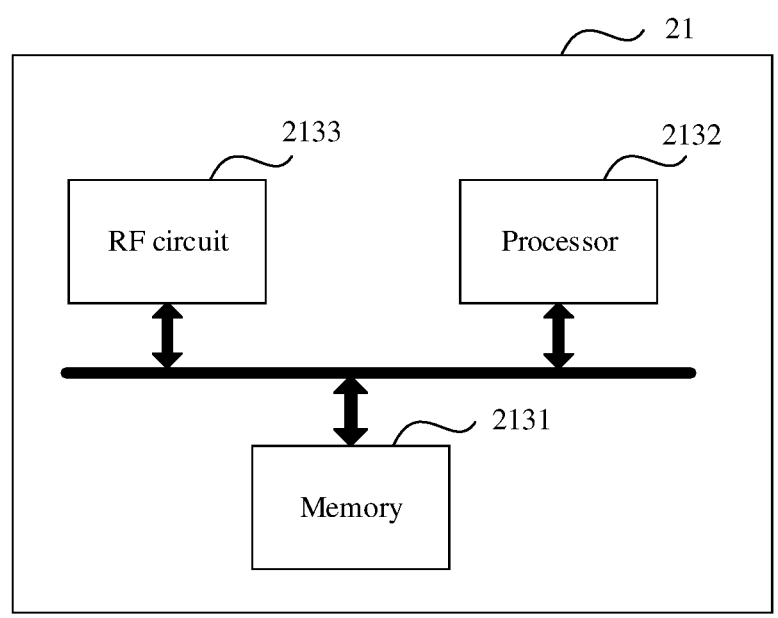
FIG. 21 is a schematic structural diagram 3 of a radar signal processing apparatus according to an embodiment of this application.

In an example embodiment, the processing module 2022 may be a processor 2132 in FIG. 21, the communications module 2023 may be an RF circuit 2133 in FIG. 21, and the storage module 2021 may be a memory 2131 in FIG. 21. One or more programs are stored in the memory, and the one or more programs include one or more instructions. When the one or more instructions are executed by the radar signal processing apparatus, the radar signal processing apparatus is enabled to perform the related method in FIG. 10.

An embodiment of this application further provides a radar signal processing apparatus, including a processor and a memory. The memory is configured to store a program, and the processor invokes the program stored in the memory, so that the radar signal processing apparatus performs the related method in FIG. 10.

An embodiment of this application further provides a computer storage medium that stores one or more programs. The computer storage medium stores a computer program. When the computer program is executed by a processor, a radar signal processing apparatus is enabled to perform the related method in FIG. 10.

An embodiment of this application further provides a computer program product including one or more instructions. When the computer program product runs on a radar signal processing apparatus, the radar signal processing apparatus is enabled to perform the related method in FIG. 10.

An embodiment of this application provides a chip system. The chip system includes a processor, configured to support a radar signal processing apparatus in performing the related method in FIG. 10. For example, a first radar signal is transmitted on a first frequency band; a second radar signal is transmitted on a second frequency band; a first reflected signal and a second reflected signal are received, where the first reflected signal is an electromagnetic wave obtained after the first radar signal is reflected by a target object, and the second reflected signal is an electromagnetic wave obtained after the second radar signal is reflected by the target object; and at least one of range information, velocity information, and angle information of the target object is obtained. In an example embodiment, the chip system further includes a memory. The memory is configured to store one or more program instructions and data that are necessary for a terminal device. The chip system may include a chip and an integrated circuit, or may include a chip and another discrete device. This is not specifically limited in embodiments of this application.

The radar signal processing apparatus, the computer storage medium, the computer program product, or the chip system provided in this application is configured to perform the radar signal processing method described above. Therefore, for beneficial effects that can be achieved by the radar signal processing apparatus, the computer storage medium, the computer program product, or the chip system, refer to the beneficial effects in the implementations provided above. Details are not repeated herein.

It should be understood that sequence numbers of the foregoing processes do not mean execution sequences in various embodiments of this application. The execution sequences of the processes should be determined according to functions and internal logic of the processes, and should not be construed as any limitation on the embodiments of this application.

A person of ordinary skill in the art may understand that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not repeated herein.

In the several embodiments provided in this application, it should be understood that the disclosed system, device, and method may be implemented in other manners. For example, the described device embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the devices or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When a software program is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The foregoing descriptions are merely specific implementations of this application, and are not intended to limit the protection scope, which is intended to cover any variation or replacement readily determined by a person of ordinary skill in the art. Therefore, the claims shall define the protection scope.

What is claimed is:

1. A radar signal processing method performed by a first apparatus, comprising:
    transmitting a first radar signal on a first frequency band, wherein the first radar signal has a waveform of a first frequency modulated continuous wave and the first frequency modulated continuous wave is a triangular wave having a rising edge and a falling edge, the rising edge is sent in a first time unit and the falling edge is sent in a second time unit subsequent to the first time unit, and the second time unit having a same duration as the first time unit, so that the sending of the rising edge of the first frequency modulated continuous wave has a same duration as the sending of the falling edge of the first frequency modulated continuous wave;
    transmitting a second radar signal on a second frequency band, wherein the second radar signal has a waveform of a second frequency modulated continuous wave, the second frequency modulated continuous wave is a triangular wave having a falling edge and a rising edge, and the falling edge is sent in the first time unit and the rising edge is sent in the second time unit subsequent to the first time unit, so that the sending of the rising edge of the second frequency modulated continuous wave has a same duration as the sending of the falling edge of the second frequency modulated continuous wave;
    receiving a first reflected signal and a second reflected signal, wherein the first reflected signal is an electromagnetic wave reflected by a target object in response to the first radar signal, and the second reflected signal is an electromagnetic wave reflected by the target object in response to the second radar signal; and
    obtaining at least one of distance information, velocity information, or angle information of the target object based on the received first reflected signal and/or the second reflected signal,
    wherein a slope of frequency of the first radar signal and a slope of frequency of the second radar signal have a same absolute value in each time point during the sending of the first and second frequency modulated continuous waves in the first and second time units, wherein a slope is a variation of frequency of a linear frequency modulated continuous wave in a unit time,
    wherein a starting moment of sending the first frequency modulated continuous wave is the same as a starting moment of sending the second frequency modulated continuous wave, and the starting moment is a beginning of the first time unit.

2. The radar signal processing method according to claim 1, wherein obtaining the at least one of distance information, velocity information, or angle information of the target object comprises:
  obtaining the at least one of the distance information, the velocity information, or the angle information based on the first radar signal and the first reflected signal;
  obtaining the at least one of the distance information, the velocity information, or the angle information based on the second radar signal and the second reflected signal; or
  obtaining the at least one of the distance information, the velocity information, or the angle information based on the first radar signal, the first reflected signal, the second radar signal, and the second reflected signal.

3. The radar signal processing method according to claim 1, wherein
  the first radar signal and the second radar signal are transmitted in a third time unit; and
  a duration of the first radar signal is the same as a duration of the second radar signal, and a length of the fit-third time unit is equal to a length of the duration of the first radar signal.

4. The radar signal processing method according to claim 1, wherein
  the first frequency band and the second frequency band do not completely overlap in frequency domain.

5. The radar signal processing method according to claim 1, wherein each of the first and second linear frequency modulated continuous waves is an electromagnetic wave whose frequency linearly increases or decreases with time.

6. The radar signal processing method according to claim 5, wherein frequency variations of the first radar signal and the second radar signal in the unit of time are opposites.

7. The radar signal processing method according to claim 1, wherein frequency variations of the first radar signal and the second radar signal in the unit of time are the same.

8. The radar signal processing method according to claim 1, wherein the slope of frequency of the first radar signal and the slope of frequency of the second radar signal have different signs in each time point during the sending of the first and second frequency modulated continuous waves in the first and second time units.

9. The radar signal processing method according to claim 8, wherein a sign the slope of frequency of the first radar signal is positive, and a sign of the slope of frequency of the second radar signal is negative.

10. The radar signal processing method according to claim 8, wherein a sign the slope of frequency of the first radar signal is negative, and a sign of the slope of frequency of the second radar signal is positive.

11. A radar signal processing apparatus, comprising:
  one or more processors, and
  a memory storing program instructions that, when executed by the one or more processors, cause the radar signal processing apparatus to:
  transmit a first radar signal on a first frequency band, wherein the first radar signal has a waveform of a first frequency modulated continuous wave and the first frequency modulated continuous wave is a triangular wave having a rising edge and a falling edge, the rising edge is sent in a first time unit and the falling edge is sent in a second time unit subsequent to the first time unit, and the second time unit having a same duration as the first time unit, so that the sending of the rising edge of the first frequency modulated continuous wave has a same duration as the sending of the falling edge of the first frequency modulated continuous wave;
  transmit a second radar signal on a second frequency band, wherein the second radar signal has a waveform of a second frequency modulated continuous wave, the second frequency modulated continuous wave is a triangular wave having a falling edge and a rising edge, and the falling edge is sent in the first time unit and the rising edge is sent in the second time unit subsequent to the first time unit, so that the sending of the rising edge of the second frequency modulated continuous wave has a same duration as the sending of the fulling edge of the second frequency modulated continuous wave;
  receive a first reflected signal and a second reflected signal, wherein the first reflected signal is an electromagnetic wave reflected by a target object in response to the first radar signal, and the second reflected signal is an electromagnetic wave reflected by the target object in response to the second radar signal; and
  obtain at least one of distance information, velocity information, or angle information of the target object based on the received first reflected signal and/or the second reflected signal,
  wherein a slope of frequency of the first radar signal and a slope of frequency of the second radar signal have a same absolute value in each time point during the sending of the first and second frequency modulated continuous waves in the first and second time units, wherein a slope is a variation of frequency of a linear frequency modulated continuous wave in a unit time,
  wherein a starting moment of sending the first frequency modulated continuous wave is the same as a starting moment of sending the second frequency modulated continuous wave, and the starting moment is a beginning of the first time unit.

12. The radar signal processing apparatus according to claim 11, wherein the instructions, when executed by the one or more processors, further cause the radar signal processing apparatus to:
  obtain the at least one of the distance information, the velocity information, or the angle information based on the first radar signal and the first reflected signal; or
  obtain the at least one of the distance information, the velocity information, or the angle information based on the second radar signal and the second reflected signal; or
  obtain the at least one of the distance information, the velocity information, or the angle information based on the first radar signal, the first reflected signal, the second radar signal, and the second reflected signal.

13. The radar signal processing apparatus according to claim 11, wherein
  the first radar signal and the second radar signal are transmitted in a third time unit; and
  a duration of the first radar signal is the same as a duration of the second radar signal, and a length of the third time unit is equal to a length of the duration of the first radar signal.

14. The radar signal processing apparatus according to claim 11, wherein
  the first frequency band and the second frequency band do not completely overlap in frequency domain.

15. The radar signal processing apparatus according to claim 11, wherein each of the first and second linear frequency modulated continuous waves is an electromagnetic wave whose frequency linearly increases or decreases with time.

16. The radar signal processing apparatus according to claim 15, wherein frequency variations of the first radar signal and the second radar signal in the unit of time are opposites.

17. The radar signal processing apparatus according to claim 11, wherein frequency variations of the first radar signal and the second radar signal in the unit of time are the same.

18. A vehicle, comprising a radar signal processing apparatus, wherein the radar signal processing apparatus comprises:
one or more processors, and
a memory storing program instructions that, when executed by the one or more processors, cause the radar signal processing apparatus to:
transmit a first radar signal on a first frequency band, wherein the first radar signal has a waveform of a first frequency modulated continuous wave and the first frequency modulated continuous wave is a triangular wave having a rising edge and a falling edge, the rising edge is sent in a first time unit and the falling edge is sent in a second time unit subsequent to the first time unit, and the second time unit having a same duration as the first time unit, so that the sending of the rising edge of the first frequency modulated continuous wave has a same duration as the sending of the falling edge of the first frequency modulated continuous wave;
transmit a second radar signal on a second frequency band, wherein the second radar signal has a waveform of a second frequency modulated continuous wave, the second frequency modulated continuous wave is a triangular wave having a falling edge and a rising edge, and the falling edge is sent in the first time unit and the rising edge is sent in the second time unit subsequent to the first time unit, so that the sending of the rising edge of the second frequency modulated continuous wave has a same duration as the sending of the fulling edge of the second frequency modulated continuous wave,
receive a first reflected signal and a second reflected signal, wherein the first reflected signal is an electromagnetic wave reflected by a target object in response to the first radar signal, and the second reflected signal is an electromagnetic wave reflected by the target object in response to the second radar signal; and
obtain at least one of distance information, velocity information, or angle information of the target object based on the received first reflected signal and/or the second reflected signal,
wherein a slope of frequency of the first radar signal and a slope of frequency of the second radar signal have a same absolute value in each time point during the sending of the first and second frequency modulated continuous waves in the first and second time units wherein a slope is a variation of frequency of a linear frequency modulated continuous wave in a unit time,
wherein a starting moment of sending the first frequency modulated continuous wave is the same as a starting moment of sending the second frequency modulated continuous wave, and the starting moment is a beginning of the first time unit.

* * * * *

UNITED STATES PATENT AND TRADEMARK OFFICE
CERTIFICATE OF CORRECTION

PATENT NO. : 11,982,731 B2
APPLICATION NO. : 17/238276
DATED : May 14, 2024
INVENTOR(S) : Lutao Gao et al.

It is certified that error appears in the above-identified patent and that said Letters Patent is hereby corrected as shown below:

In the Claims

Column 21, Claim 3, Line 21, change "fit-third" to --third--;

Column 22, Claim 11, Line 12, change "fulling" to --falling--; and

Column 24, Claim 18, Line 6, change "fulling" to --falling--.

Signed and Sealed this
Eleventh Day of June, 2024

*Katherine Kelly Vidal*

Katherine Kelly Vidal
*Director of the United States Patent and Trademark Office*